United States Patent
Dahm et al.

(10) Patent No.: US 10,999,653 B2
(45) Date of Patent: May 4, 2021

(54) DETECTING AND MONITORING LOCATION OF WIRELESS-ENABLED DEVICES IN A PHYSICAL SPACE

(71) Applicant: Dahm Endeavor LLC, Monroe, MI (US)

(72) Inventors: Matthew Dahm, Monroe, MI (US);
Kevin Dahm, II, Monroe, MI (US);
Kevin Dahm, Monroe, MI (US);
Jeanmarie Dahm, Monroe, MI (US)

(73) Assignee: Dahm Endeavor LLC, Monroe, MI (US)

( * ) Notice: Subject to any disclaimer, the term of this patent is extended or adjusted under 35 U.S.C. 154(b) by 42 days.

(21) Appl. No.: 16/405,158

(22) Filed: May 7, 2019

(65) Prior Publication Data

US 2020/0359113 A1 Nov. 12, 2020

(51) Int. Cl.
| | |
|---|---|
| *G06F 3/033* | (2013.01) |
| *H04Q 9/00* | (2006.01) |
| *H04L 29/06* | (2006.01) |
| *G06N 7/00* | (2006.01) |
| *H04W 84/18* | (2009.01) |

(52) U.S. Cl.
CPC ............... *H04Q 9/00* (2013.01); *G06N 7/005* (2013.01); *H04L 63/1491* (2013.01); *H04Q 2209/40* (2013.01); *H04W 84/18* (2013.01)

(58) Field of Classification Search
CPC ...... H04Q 9/00; H04Q 2209/40; G06N 7/005; H04L 63/1491; H04W 84/18; H04W 84/12; H04W 64/00
See application file for complete search history.

(56) References Cited

U.S. PATENT DOCUMENTS

| | | | |
|---|---|---|---|
| 5,973,998 A | 10/1999 | Showen et al. | |
| 8,218,449 B2* | 7/2012 | Taylor | H04W 24/00 |
| | | | 370/252 |
| 9,830,932 B1 | 11/2017 | Gunderson et al. | |
| 9,852,388 B1* | 12/2017 | Swieter | H04Q 9/00 |
| 2006/0114749 A1 | 6/2006 | Baxter et al. | |
| 2007/0045243 A1 | 3/2007 | Sinha | |
| 2008/0084788 A1 | 4/2008 | Showen et al. | |
| 2009/0049001 A1* | 2/2009 | Nickerson | G06N 5/02 |
| | | | 706/52 |
| 2013/0043130 A1 | 2/2013 | Lednev et al. | |
| 2014/0269199 A1 | 9/2014 | Weldon et al. | |
| 2014/0361886 A1 | 12/2014 | Cowdry | |
| 2015/0070166 A1 | 3/2015 | Boyden et al. | |
| 2015/0358338 A1* | 12/2015 | Zeitlin | H04L 63/1416 |
| | | | 726/23 |
| 2016/0209390 A1 | 7/2016 | Overcast | |
| 2016/0232774 A1 | 8/2016 | Noland et al. | |
| 2016/0359878 A1* | 12/2016 | Prasad | H04L 45/38 |
| 2017/0018167 A1* | 1/2017 | Dey | G08B 29/20 |

(Continued)

*Primary Examiner* — Munear T Akki
(74) *Attorney, Agent, or Firm* — Carr & Ferrell LLP

(57) ABSTRACT

Wireless-enabled devices are becoming more ubiquitous in society. Detection and analysis of movement of these devices in a known physical space can aid in detecting cyber threats present in the physical space, as well as physical threats to life in the space. Embodiments of the present disclosure are directed to solutions for detecting, monitoring, and analyzing wireless-enabled device movement and utilizing this information to determine a probable threat in a physical space.

20 Claims, 5 Drawing Sheets

(56) References Cited

U.S. PATENT DOCUMENTS

| | | |
|---|---|---|
| 2017/0153180 A1 | 6/2017 | Basu et al. |
| 2018/0102032 A1* | 4/2018 | Emmanuel ........ H04W 28/0236 |
| 2019/0200168 A1* | 6/2019 | Stapleford ............ H04W 4/029 |
| 2020/0036727 A1* | 1/2020 | Pegg .................... H04W 12/06 |

* cited by examiner

DETECTING AND MONITORING LOCATION OF WIRELESS-ENABLED DEVICES IN A PHYSICAL SPACE

CROSS REFERENCE TO RELATED APPLICATIONS

N/A

FIELD OF THE INVENTION

The present disclosure relates to detection, monitoring, and analysis of movement of wireless-enabled devices in a physical space, parking lot, or surrounding property.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In one embodiment, the present technology is directed to a method for detecting and monitoring a plurality of wireless-enabled objects in a physical space, the method comprising: utilizing a plurality of sensors in the physical space to scan the physical space at a first time for wireless-enabled objects located within a predetermined distance from each of the plurality of sensors; receiving an identifier for each wireless-enabled object located within the predetermined distance from each of the plurality of sensors; determining a location for each wireless-enabled device detected; utilizing the plurality of sensors in the physical space to scan the physical space at a second time for wireless-enabled objects located within the predetermined distance from each of the plurality of sensors; receiving an identifier and location for each wireless-enabled object detected; determining a probability that wireless-enabled device has moved in the time interval between the first time and the second device; determining a probability of a threat in the physical space; and transmitting the probability of the threat in the physical space to an administrative user computing device.

In an embodiment, the present technology is directed to a system comprising: a wireless communication network; a plurality of wireless-enabled devices located in a physical space, the wireless-enabled devices configured to communicate via the wireless communication network; a plurality of sensors in the physical space, each of the plurality of sensors configured to communicate via the wireless communicate network with the plurality of wireless-enabled objects in the physical space; an interactive electronic map for the physical space with a known marked location for each of the plurality of sensors; and a processor configured to execute instructions to: receive information from the plurality of sensors regarding a location and identifier of each wireless-enabled device located in the physical space at periodic time intervals; determine a probability of a threat in the physical space; and transmit the probability of the threat in the physical space to an administrative user computing device.

Other features, examples, and embodiments are described below.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
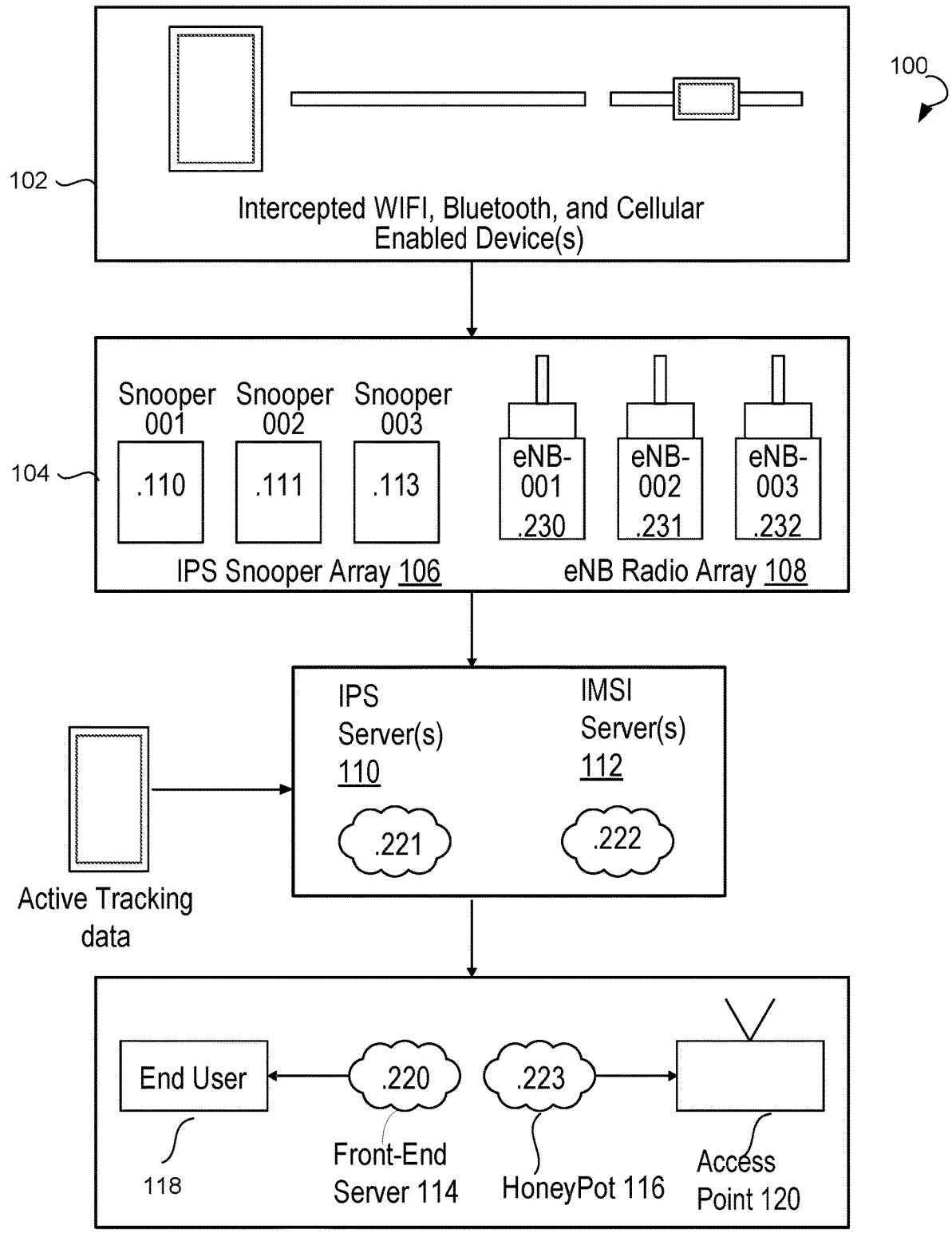
FIG. 1 illustrates a simplified exemplary environment for practicing embodiments of the present disclosure.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown as block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Wireless-Enabled Device

The present disclosure pertains to monitoring a location of at least one wireless-enabled device. As referred to herein, a wireless-enabled device can be any device capable of communicating over any type of wireless network. For example, a wireless-enabled device may comprise a smartphone, tablet, smartwatch, laptop computer, Nest or other smart thermometer, voice activated digital assistant (like Amazon Echo, Google Home), network printer, 2-way radio, router, smart TV, smart appliance, automobile, drone, or any other item with wireless communication capability. In various embodiments, a wireless-enabled device can communicate over at least one type of wireless network, such as Wi-Fi network, Bluetooth, RFID, radio, Cellular network, etc.

In a physical space, it can be advantageous to monitor the wireless-enabled devices present in the physical space and the movement of those devices. For example, during an emergency situation (such as an active shooter situation), it can be useful to know that one particular wireless-enabled device is moving around the building, while most other wireless-enabled devices are staying in approximately the same spot. This indicates a high probability that the moving wireless-enabled device belongs to the shooter, and can provide additional information for authorities to estimate where to expect to find the shooter.

In other types of emergencies, such as a structural damage to a building during a severe weather event or earthquake, knowing the location of wireless-enabled devices may help first responders to know where to look for people who may have become trapped, since a wireless-enabled device is likely to be on or near a person.

In further use cases, a sensitive item like a firearm may be authorized for use by a limited number of people in a building. For example, specific teachers or principals may have access to a firearm in a school, and it is important that the firearm does not fall into the wrong hands. In this scenario a wireless tracking chip can be attached to the firearm so that its location and movement can be tracked within the building.

Further, the present disclosure can be utilized as a secondary check when a person is closing and locking up a building at the end of the day. A quick check can be conducted to ensure that no one has been left behind in the building by scanning for wireless-enabled devices.

The present disclosure is directed to various methods for tracking movement of wireless-enabled devices within a physical space. In exemplary embodiments, an interactive electronic map is generated of the physical space. This interactive electronic map may be based on a floor plan or other architectural diagram of the space.

Also located on the interactive electronic map is the location of each of a plurality of sensors that are installed in the physical space. The sensors may be installed on walls, ceiling, floor, or on other movable and non-movable objects within the space. As would be understood by persons of ordinary skill in the art, there can be any number of sensors in a space, depending on the size of the space. Typically, there may be 3-100 sensors present.

FIG. 1 illustrates a simplified exemplary environment 100 for practicing embodiments of the present disclosure. The present disclosure relates chiefly to wireless-enabled devices that are present in a physical space. The physical space can be any enclosed space such as a single room space, multi room space, single story building or multiple story building. The physical space can also be any unenclosed space, such as a parking lot. By way of non-limiting example, the physical space can be a room, office building, restaurant, residence, school, recreation center, etc. The physical space may further have at least one wireless communication network for wireless-enabled devices to communicate with one another and with the Internet.

In embodiments of the present disclosure, a wireless signal from a wireless-enabled device 102 (also sometimes referred to herein as simply device 102) can be intercepted by at least one of a plurality of sensors 104 that are located in advance in the physical space. The sensors 104 can take any number of forms.

In one example, an array of sensors called an "IPS snooper array" 106 is present in the space. The sensors of the IPS snooper array 106 may be configured to communicate with the wireless-enabled devices 102 via Wi-Fi, Bluetooth, Cellular signal, or other wireless means. In exemplary embodiment, each IPS snooper of the IPS snooper array 106 is a small computer (e.g. raspberry pi) that uses a specific RTL chip that allows for monitoring mode of a Wi-Fi signal.

In another exemplary embodiment, an array of sensors called an "eNB radio array" 108 is present in the space. The sensors of the eNB radio array 108 may be configured to communicate with wireless-enabled devices 102 via a cellular signal, such as 3G, 4G, 4G LTE, 5G, etc.

Data captured from the IPS snooper array 106 may further be transmitted via either a wired or wireless means to one or more IPS server(s) 110. Data captured from the eNB radio array 108 may similarly be transmitted via either a wired or wireless means to one or more IMSI server(s) 112. The IPS server 110 and the IMSI server 112 may operate on one or more physical computing devices and/or may be a virtual server in a cloud computing environment.

The IPS server 110 and/or the IMSI server 112 may further conduct analysis of the received data and transmit information to a front-end server 114. From there, information can be viewed by an end user administrator 118 on a computing device of the administrator.

Alternatively, items that have been identified as potentially malicious or potentially vulnerable to malicious activity may be mirrored on a HoneyPot 116 to virtualize and host via one or more access points 120. Each of these components is discussed in further detail herein.

Figure 2:
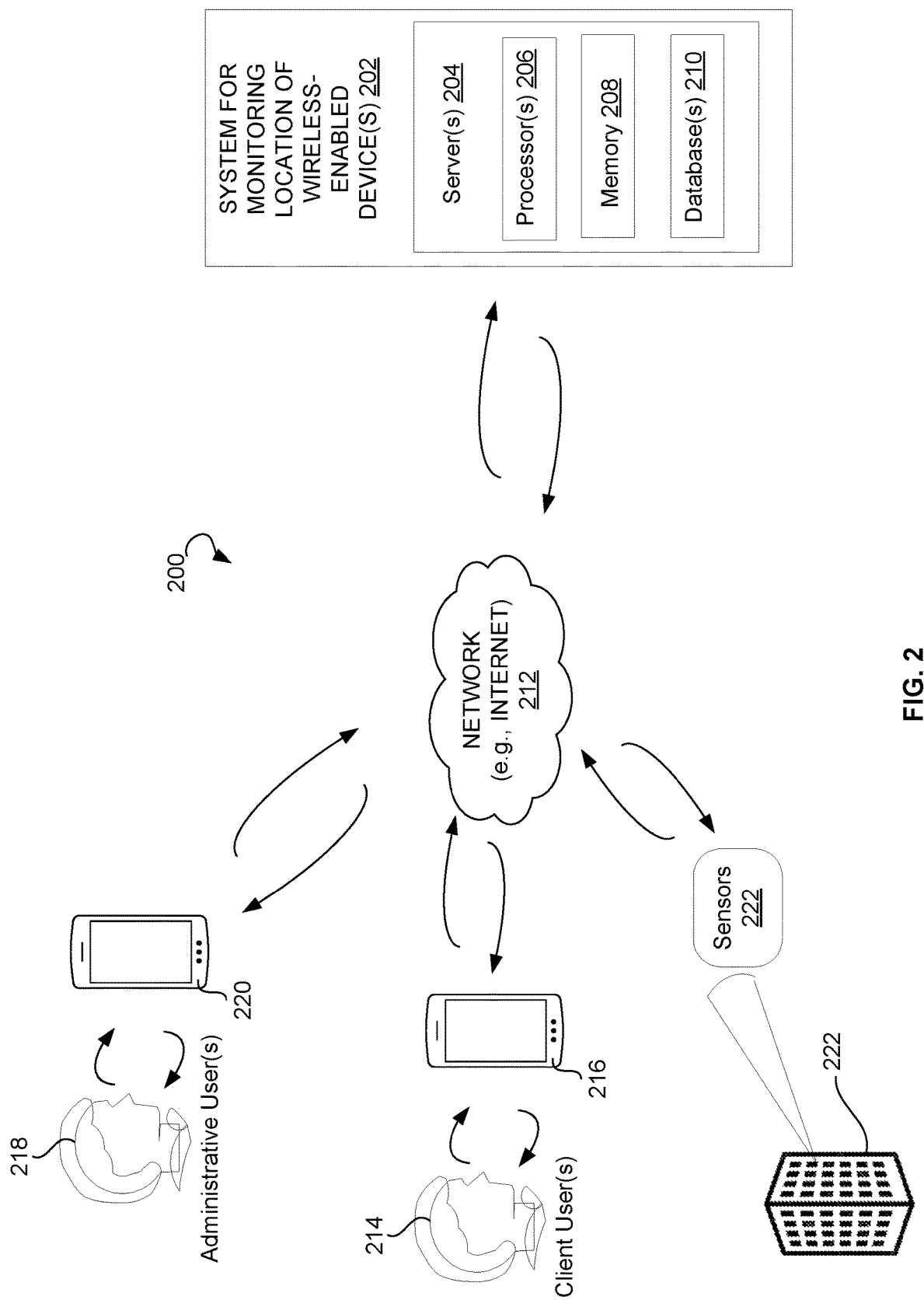
FIG. 2 illustrates an exemplary simplified environment for a system for monitoring location of wireless-enabled devices in a physical space.

FIG. 2 illustrates an exemplary simplified environment 200 for a system for monitoring location of wireless-enabled devices 202 in a physical space. In exemplary embodiments, the system for monitoring location of wireless-enabled device(s) 202 is a server-based distributed software application, thus the system 202 may include a central component residing on a server 204 and one or more client applications residing on one or more user devices and communicating with the central component via the network 212. Users may communicate with the system 202 via a client application available through user devices.

System 202 may comprise software application(s) for receiving, processing, analyzing, and outputting data to and from sensors 222 and/or user devices. In exemplary embodiments, at least some components of system 202 operate on one or more cloud computing devices or servers. Server(s) 204 may comprise at least one processor 206, memory 208, and database 210.

Processor(s) 206 may be any suitable hardware processor for executing the software program on server(s) 204. Processor(s) 206 may include a programmable processor, such as a microcontroller, central processing unit (CPU), and so forth. In other embodiments, the processor(s) 206 may include an application-specific integrated circuit or programmable logic array, such as a field programmable gate array, designed to implement the functions performed by the system for monitoring location of wireless-enabled devices 202.

Memory 208 may comprise static and/or dynamic memory.

Database(s) 210 may be any data structure capable of containing information for use by the system 202. Database(s) 210 may include computer-readable instructions for execution by processor 206.

In various embodiments, the system for monitoring location of wireless-enabled devices 202 may be installed on a user computing device or may be provided as a cloud service residing in a cloud storage. The operations performed by the processor 206 and the database 210 are described in further detail herein.

System for monitoring location of wireless-enabled devices 202 may further be in communication with administrative user(s) 218, client users 214, and sensors 104. There may be additional components in communication with system 202 than those depicted in exemplary FIG. 2. For example, though not depicted in exemplary FIG. 2, system 202 may further be in communication with one or more emergency response services, such as a police department, fire department, or emergency medical service.

In various embodiments, administrative user(s) 218 may access data from system 202 on administrative user device 220, which is in communication with system 202 via network 212. Administrative user device 220 may be any computing device with a graphical user display and input mechanisms available to administrative user 218. Further, administrative user device 220 may be a wireless-enabled device, as defined here. In addition, system 202 may send alerts to administrative user device 220 in the form of a pop-up alert, text message, email message, phone call, or any other means of communicating with administrative user device 220.

Client user(s) 214 may also access data from system 202 on client user device 216, which is in communication with system 202 via network 212. Client user device 216 may be any computing device with a graphical user display and input mechanisms available to client user 214. Further, client user device 216 may be a wireless-enabled device, as defined here. In exemplary embodiments, system 202 may send alerts to client user device 216 in the form of a pop-up alert, text message, email message, phone call, or any other means of communicating with client user device 216.

As discussed herein, building 222 may be any physical space with a plurality of sensors 222 installed therein. Sensors 222 may be in communication with system 202 via network 212. Sensors 222 may be any type of sensor, such as sensors 104 described in reference to FIG. 1 herein.

The network 212 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection.

Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 212 can further include or interface with any one or more of an RS-232 serial connection, an IEEE-1394 (FireWire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking.

The network 212 may be a network of data processing nodes that are interconnected for the purpose of data communication. The network 212 may include any suitable number and type of devices (e.g., routers and switches) for forwarding commands, content, requests, and/or responses between each system 202 and connected devices.

System 202 may have different modes of operation, for detecting and monitoring location of wireless-enabled devices.

Passive Tracking

In a passive tracking mode, a plurality of sensors (at least three) intercepts a wireless signal from a wireless-enabled device. The Received Signal Strength Indicator (RSSI) is a measurement of how well a sensor can hear a signal from a wireless-enabled device. An RSSI value can be pulled from the wireless-enabled device's Wi-Fi card. This received RSSI value can be converted into a measurement. Each sensor transmits information regarding the RSSI signal strength (power of signal intercepted), along with a MAC (Media access control) address for the device from which the signal was intercepted to an IPS (Intrusion Prevention System) server to process the information and determine a location of the device associated with the MAC address.

In various embodiments, the IPS server utilizes triangulation (or trilateration) methods to determine a location of the device associated with the MAC address. The location of the wireless signal can be determined from the known locations of the sensors in the physical space, as well as the known map of the physical space.

The IPS server may also have RSSI fingerprinting data so it can determine a probability that the device with the intercepted MAC address is actually at the determined location.

While the above description discusses intercepting a single wireless signal from one device with an associated MAC address, there can be many wireless signals detected from a plurality of wireless-enabled devices located in the physical space. Additionally, there can be multiple wireless signals from one device, such as Wi-Fi and Bluetooth (BLE).

Spoofing

In various embodiments, a wireless-enabled device may transmit a spoofed MAC address to at least one sensor. For example, devices made by a specific manufacturer may have a certain portion of the MAC address spoofed, so that an administrator may only determine that an wireless-enabled device of the specific manufacturer (such as Apple, Samsung, LG, etc.) is present, but not be able to determine a specific legitimate identifier for that wireless-enabled device.

In various embodiments, the passive tracking scanning for wireless-enabled devices occurs at a predetermined time period that can be adjusted by an administrator. The predetermined time period may be less than 1 second-5 minutes. In preferred embodiments, the predetermined time period is 40 seconds. The system for monitoring location of wireless-enabled devices may compare the number of devices scanned and their corresponding MAC addresses over time to determine which device MAC addresses may be spoofed. For example, 15 devices may be picked up by the passive scanning method at a first time. When the next scanning occurs at a second time (40 seconds later), the system for monitoring location of wireless-enabled devices may determine that 15 devices are also picked up by the scanning and in approximately the same location, but the MAC address of at least one of the devices has changed. From this information, the system can probabilistically determine that the two different MAC addresses from a device at the same location are most likely both attributable to a single wireless-enabled device.

At a third time period (40 seconds later), a similar analysis can be conducted for the system for monitoring location of wireless-enabled devices. Based on a comparison of location data, and knowledge of the physical space from the interactive electronic map, an estimate can be made as to how far a person with a wireless-enabled device can reasonably travel in the time interval. From this, a list of probable MAC address for each specific wireless-enabled device can be generated and maintained.

In other embodiments, if a new MAC address is scanned at a scanning time, and the location of the associated wireless-enabled device is different from a previous scan, then no definitive conclusion can be made as to whether the newly scanned MAC address is for a new wireless-enabled device, or a different spoofed MAC address for a previously scanned wireless-enabled device. After a plurality of rounds of scanned data, a probability analysis can be conducted to determine a confidence for estimation as to the wireless-enabled devices and their associated MAC addresses in a physical space.

Active Tracking

In an active tracking mode, system 202 may utilize an app installed on client user device(s) 216. When the app on client user device(s) 216 is activated, it can send out a signal that is picked up by one or more sensor(s) 222 or access point(s) in the space. Since the app operating on client user device 216 is a trusted software program, the wireless signal transmitted by client user device 216 contains the actual MAC address for client user device 216 (and not a spoofed address). In this way, system 202 can learn which wireless-enabled devices are present in a physical space, their respective locations, and their respective MAC addresses.

In some embodiments, system 202 can cross-check results from active scanning with the passive scanning results. For some wireless-enabled devices that are in a similar location within a similar time period, the MAC addresses can be compared and the active scanned MAC address can replace the passive scanned MAC address received, if they are in conflict.

In one example, 10 wireless-enabled devices are activated when the app is launched and are actively being tracked. System 202 may determine that only 6 of the MAC addresses received from the active scanning results are present in its generated list of present wireless-enabled devices. System 202 may then conclude that the other 4 wireless-enabled devices present and enabled for active scanning have spoofed MAC addresses in passive scanning results.

In addition, system 202 may do a request/send operation to the 4 wireless-enabled devices present and enabled for active scanning, but whose MAC addresses are not present in the passive scanning results. In the request/send operation, system 202 may send the MAC address received from active scanning results to the respective wireless-enabled device to confirm whether it is in fact the actual MAC address for that device. In this way, a legitimate pool of MAC addresses not picked up from passive scanning can be generated. By utilizing a combination of active scanning and passive scanning for wireless-enabled devices, the actual number of present wireless-enabled devices, their corresponding MAC addresses, and their locations can be determined with more precision and granularity. Further, active scanning results assist in narrowing a list of devices with spoofed MAC addresses.

In various embodiments, client user device 216 may send out a wireless signal for active scanning on a periodic time interval when the app is turned on. The periodic time interval can range from 5 seconds to 120 seconds, in various embodiments. The periodic time interval can be customizable by administrative user 218 and/or system 202. Further, the periodic time interval can be customizable based on external factors such as wireless signal strength for client user device 216, battery life of client user device 216, data usage, and any other factor related to client user device 216 or client user 214.

Utilizing embodiments of the present disclosure, the location of wireless-enabled devices can be monitored such that system 202 can discern which wireless-enabled devices are stationary and which ones are moving. Retrieved information from sensors can be gathered and analyzed to determine a device type for various wireless-enabled devices detected. For example, a wireless-enabled device may be a router. System 202 can refer to a table of known access points in a physical space and determine which wireless-enabled devices should be moving (e.g., smartwatch) and which wireless-enabled devices should not be moving (e.g., router). By detecting wireless-enabled devices in a physical space, and tracking movement of those wireless-enabled devices, a degree of vulnerability can be discerned for the physical space, and whether a concerning situation may be occurring within the physical space.

Cellular Tracking

As depicted in FIG. 1, sensors present in a physical space may also comprise an eNB radio array 108. In various embodiments, each eNB radio of the eNB radio array 108 may comprise multi-directional transceiver antennas. The eNB radio may comprise software-defined radio for spectrum analysis to emulate a particular frequency. The antenna may be connected through a USB port.

These antennas are maintained at a predetermined power level, so that they intercept radio signals within a certain known radius only (i.e., 10 ft., 20 ft., etc.). When an eNB radio intercepts a radio signal from a cellular wireless-enabled device in a space, the array 108 can triangulate the signals to determine a location for the wireless-enabled device. Typically cellular data triangulation detects signals within a 60 ft. radius. In contrast, the eNB radio array 108 intentionally maintains antennas at lower power so that a more accurate location can be determined for a cellular wireless-enabled device.

In various embodiments, eNB radio array 108 is configured to emulate a base tower and mimic a current 4G LTE frequency utilized by different cellular service providers (e.g., Sprint, Verizon, AT&T, Boost, etc.). By emulating a signal from the cellular service provider, a wireless-enabled device of that service provider will connect to the signal. In this way, an IMSI (International Mobile Subscriber Identity) number associated with the wireless-enabled device is gleaned by eNB radio array 108. With this information, system 202 can learn subscriber information for a person attributed to a wireless-enabled device with the received IMSI number.

As would be understood by persons of ordinary skill in the art, eNB radio array 108 can transmit signals other than strictly 4G LTE signals, in various embodiments. Further, an eNB radio from eNB radio array 108 may rotate mimicking signals from various cellular service providers so that different wireless-enabled devices will connect to the transmitted signals. In exemplary embodiments, a different cellular service provider signal is mimicked every 30 seconds-5 minutes.

Data from eNB radio array 108 is transmitted to IMSI server(s) 112. MAC address information for detected wireless-enabled devices from IPS server(s) 110 can be combined with IMSI number information from IMSI server(s) 112 to generate a list of identifying information for detected wireless-enabled devices. Further, when IPS information is combined with eNB information, a more accurate location for wireless-enabled devices can be determined. That is, an eNB radio has a known radius within which it can detect a wireless signal from a wireless-enabled device. With the IPS snooper array 106 and an electronic interactive map of the space, the location of each eNB radio is known. Utilizing a combination of known locations of sensors and the electronic interactive map of the space, a physical location of a wireless-enabled device can be determined and monitored with more accuracy.

In some embodiments, a "whitelist" of persons authorized to be present in a physical space can be generated with associated MAC address information, and/or IMSI number information for the wireless-enabled devices they carry. A single person may carry multiple wireless-enabled devices, such as a smartwatch, smartphone, and tablet. Similarly, a "blacklist" of persons unauthorized to be present in a physical space can be generated with associated MAC address information, and/or IMSI number information for the known wireless-enabled devices they carry.

Front-End Operations

Returning to FIG. 1, data from IPS server(s) 110 and/or IMSI server(s) 112 may be transmitted to front-end server 114. Vulnerabilities identified as malicious may be replicated and hosted by HoneyPot 116 for analysis and penetration testing.

For example, an unsecured router may be identified as one of the wireless-enabled devices in a physical space. This information can be sent to HoneyPot 116 to host the Wi-Fi from the unsecured router for analysis as to which devices are connecting to it. The Honeypot 116 is further in communication with access point 120. Access point 120 can customize its configuration based on information from HoneyPot 116.

MAC addresses connecting to HoneyPot 116 can generally be assumed to be legitimate MAC addresses, since they can't be spoofed. By identifying MAC addresses of the wireless-enabled devices connecting to the unsecured Wi-Fi hosted by HoneyPot 116, a severity of network vulnerability can be determined. For example, if a device is connecting to HoneyPot 116 from a different country, that may indicate that a hacker is trying to steal data over the network. Alternatively, if a nearby device is connecting to it, then it may be a trustworthy connection.

While embodiments of the present disclosure have been discussed herein with reference to MAC addresses, other identifiers for wireless-enabled devices may also be used instead of, or in addition to, MAC addresses. For example, an IP address for a computing device may be utilized as well. An IP address can further assist in determining location of a wireless-enabled device.

As discussed herein, access point 120 can be any physical or virtual machine for hosting wireless network. By way of non-limiting example, access point 120 can be any of a router, repeater, etc.

Sensors

Any of the sensors discussed herein, such as sensors 104 of FIG. 1 or sensors 222 of FIG. 2, may have additional environmental sensing capabilities. For example, IPS snooper array 106 may additionally have any one or more of a particle scanner (to detect lead), sensing for volatile gases to detect a gas leak, time of flight sensor, vibration detection, sound localization sensing, heat sensing, humidity sensing, microphone, and/or camera for capturing still and moving images. With the additional information gleaned from the environmental sensing capabilities, a degree of vulnerability can be detected based on a type of wireless-enabled device and a type of signal intercepted.

For example, a sensor on IPS snooper array 106 may detect that a loud sound is registered near one particular wireless-enabled device and the wireless-enabled device is traveling through the physical space with periodic loud sounds detected near it. This may suggest to system 202 that something concerning is occurring near the wireless-enabled device and a person needs to carefully approach. For example, this may indicate that the wireless-enabled device near the registered loud sound may be an active shooter moving throughout a physical space.

In other embodiments, a microphone on an IPS snooper of IPS snooper array 106 can determine where a sound originated from (i.e., right side or left side of the snooper). It can further determine that a sound is getting closer or farther away from a known access point in the physical space.

In some embodiments, one or more additional environmental sensors on IPS snooper array 106 may be triggered on or off with trigger events. In other embodiments, one or more of the environmental sensors are always on, or may be manually turned on or off by an administrative user. In one exemplary embodiment, a sound detected over a certain threshold decibel level may trigger the activation of a camera on IPS snooper array 106 and the camera may record for a predetermined amount of time, or until a second trigger condition is met. An administrative user 218 may view the camera feed in real-time, or after the fact from system 202 to determine the source of the unusually loud sound and any action required. In exemplary embodiments, the camera can be integrated with a security system already present in the physical space.

Utilizing information gleaned from the environmental sensors with information gleaned from the IPS snooper array 106, a degree of vulnerability in a physical space can be assessed with more granularity. That is, not only can cyber threats be detected (such as hacking), but also physical threats to life can be detected. In combination with an electronic interactive map of a physical space, sound sensors and profiles can determine screaming, running, loud noises and then quiet, to determine a likely threat to life for persons inside the physical space.

Data retrieved from sensors (such as sensors 104 of FIG. 1 or sensors 222 of FIG. 2) may be stored by the system 202 for a predetermined period of time, and then moved to cold storage. In exemplary embodiments, 1 week of data may be kept by system 202 before it is moved to cold storage.

Other Embodiments

In various embodiments, a wireless-enabled device can be a concealed weapon, such as a firearm, Taser, knife, or other object designed to injure a person. A certain person may be authorized to possess the concealed weapon within a physical space. The weapon can be attached to a wireless tracking chip, which may be detected by system 202 via active tracking and/or passive tracking.

In other embodiments, persons who are authorized to be in a physical space may carry identification badges on their person. These identification badges are equipped with BLE (Bluetooth Low Energy) signals that may communicate over network 212 such that persons can be detected and tracked via active tracking and/or passive tracking.

Figure 3:
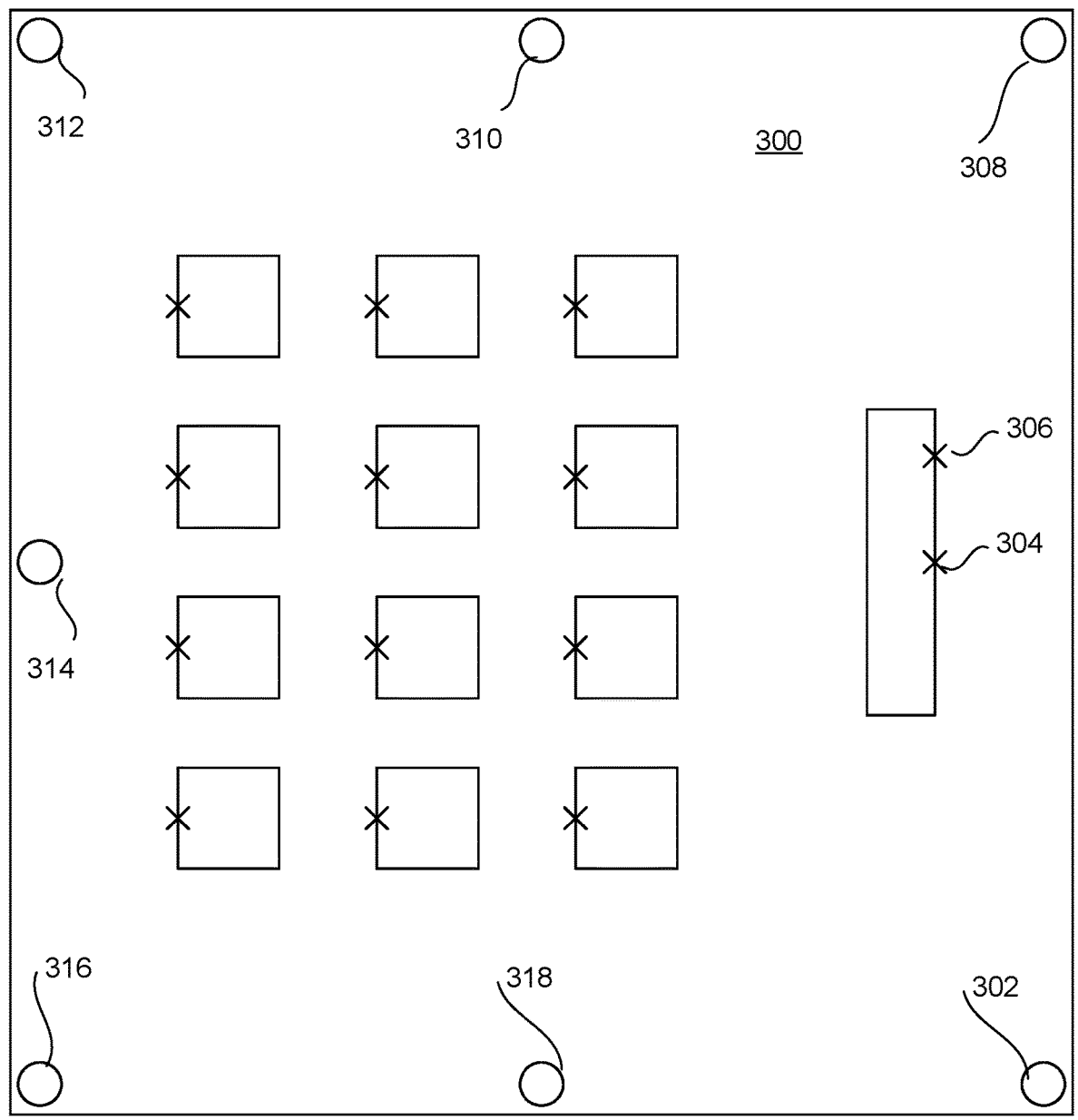
FIG. 3 depicts an exemplary drawing of a physical space that is a classroom.

FIG. 3 depicts an exemplary drawing of a physical space that is a classroom 300. Classroom 300 may have sensors 302, 308, 310, 312, 314, 315, and 318. The sensors may be IPS snoopers and/or eNB radios. The sensors may be placed anywhere in the classroom, such as on walls, ceilings, floors, or attached to movable objects.

A teacher's desk may be located at the front of classroom 300 and with 2 wireless-enabled devices detected. Device 304 may be a smartwatch on a wrist of a teacher and device 306 may be a firearm. Further, while not labeled in FIG. 3, a wireless-enabled device may be further identified for each student at his/her desk.

Utilizing embodiments of the present invention, system 202 can determine whether device 306, which is a known firearm has moved from the teacher's desk. If so, this may indicate a threat to life present in classroom 200. An alert may be transmitted to an administrative user, client user(s), and/or to an emergency service.

Figure 4:
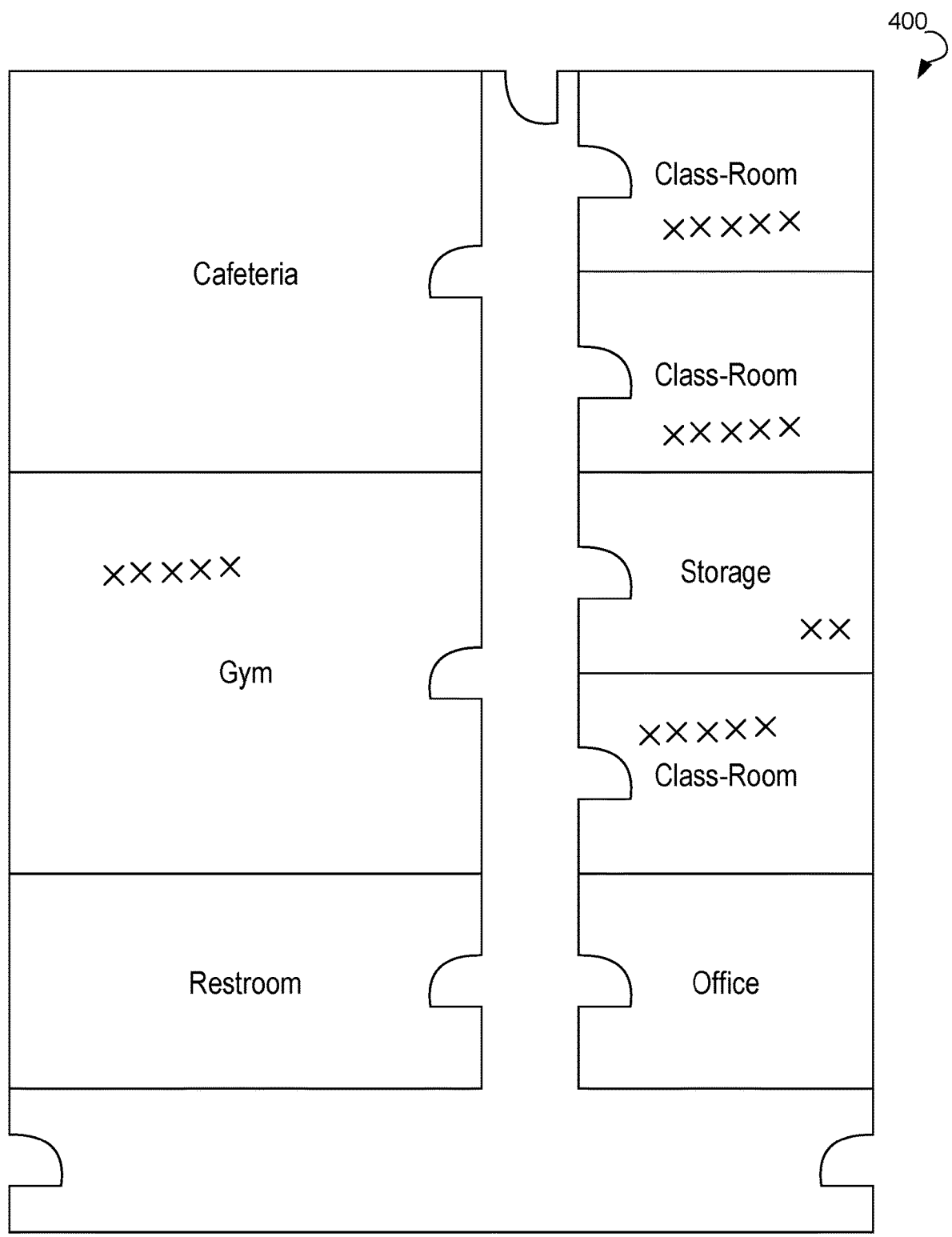
FIG. 4 depicts an exemplary map of a physical space that is a school.

System 202 can also discern which wireless-enabled devices are in locations in which they are authorized or unauthorized. For example, a student may be identified through their ID badge as being in a Principal's office alone, which is an unauthorized place for that student. Or a concealed weapon may be identified as being near an unauthorized person. In an exemplary map of a school 400 depicted in FIG. 4, wireless-enabled devices may be located as being present in a Gym and Classrooms. Based on the time of day, this can be determined to be a likely authorized presence. However, 2 wireless-enabled devices may be detected as being present in a Storage room of school 400, which may be unusual. From this information, a possible threat can be discerned and an alert may be transmitted to an administrative user, client user(s), and/or to an emergency service.

Figure 5:
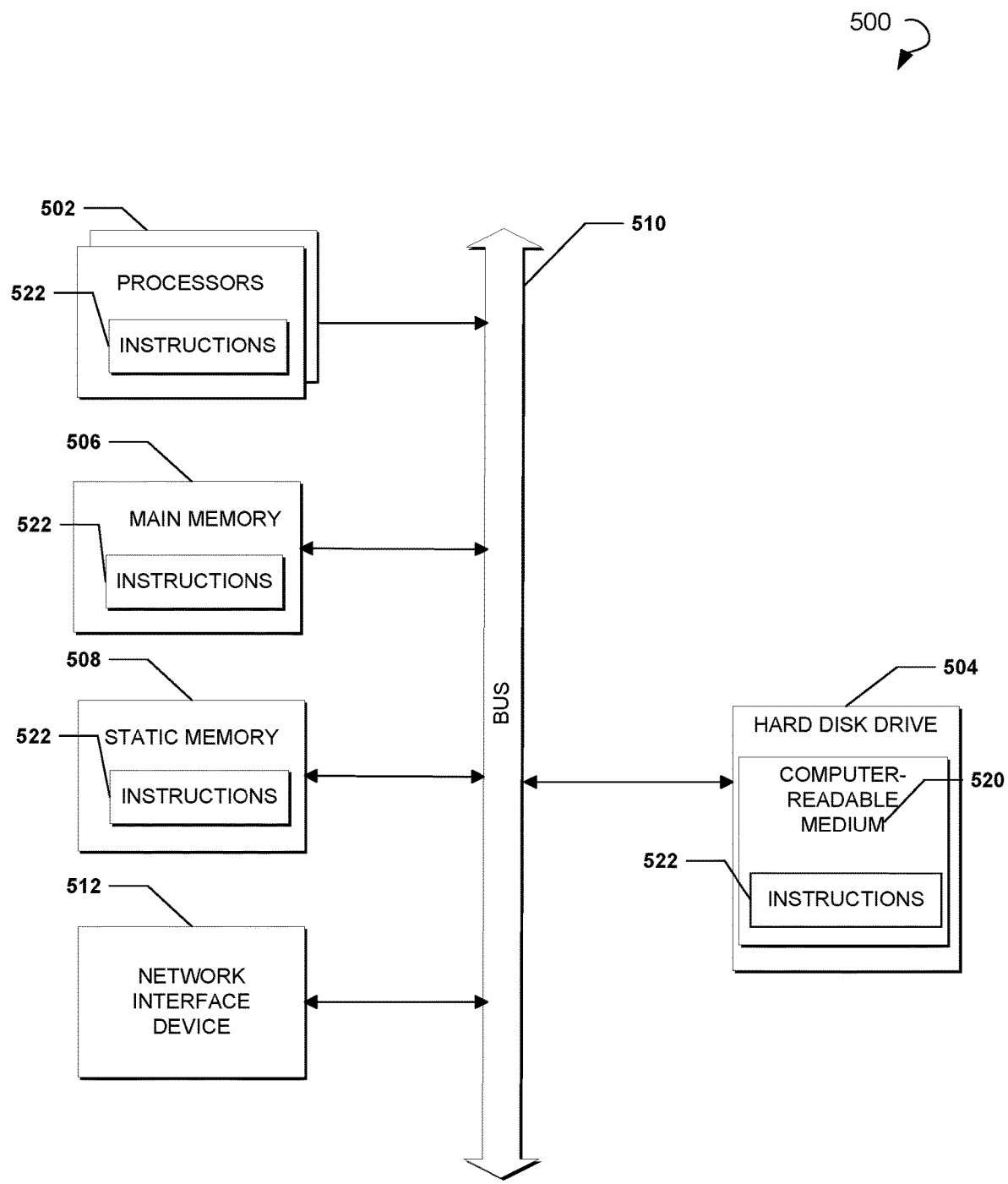
FIG. 5 is a simplified block diagram for a computing system, according to some embodiments.

Various embodiments of the present technology can be practiced with a local computer system, and/or a cloud-based system. FIG. 5 shows a diagrammatic representation of a computing device for a machine in the exemplary electronic form of a computer system 500, within which a set of instructions for causing the machine to perform any one or more of the methodologies discussed herein can be executed. Computing device 500 may be administrative user device, client user device, or any of the servers discussed herein.

In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a personal computer (PC), a tablet PC, a set-top box, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502, a hard disk drive 504, a main memory 506 and a static memory 508, which communicate with each other via a bus 510. The computer system 500 may also include a network interface device 512. The hard disk drive 504 may include a computer-readable medium 520, which stores one or more sets of instructions 522 embodying or utilized by any one or more of the methodologies or functions described herein. The instructions 522 can also reside, completely or at least partially, within the main memory 506 and/or the static memory 508 and/or within the processors 502 during execution thereof by the computer system 500. The main memory 506, the static memory 508, and the processors 502 also constitute machine-readable media.

While the computer-readable medium 520 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, Python, JavaScript, Go, or other compilers, assemblers, interpreters or other computer languages or platforms.

The processing for various embodiments may be implemented in software that is cloud-based. In some embodiments, the computer system 400 is implemented as a cloud-based computing environment, such as a virtual machine operating within a computing cloud. In other embodiments, the computer system 400 may itself include a cloud-based computing environment, where the functionalities of the computer system 400 are executed in a distributed fashion. Thus, the computer system 400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 400, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN), a wide area network (WAN), a Metropolitan Area Network (MAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products, according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, systems and methods for detecting and monitoring wireless-enabled devices in a physical space are described herein. While various embodiments have been described, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the present technology should, therefore, be determined not with reference to the above description, but instead should be determined with reference to the appended claims along with their full scope of equivalents.

What is claimed is:

1. A method for detecting and monitoring a plurality of wireless-enabled devices in a physical space, the method comprising:
   utilizing a plurality of sensors in the physical space to scan the physical space at a first time for wireless-enabled devices located within a predetermined distance from each of the plurality of sensors, the plurality of sensors comprising at least two of any of an Intrusion Prevention System snooper and an eNB radio;
   receiving an identifier for each wireless-enabled device located within the predetermined distance from each of the plurality of sensors at the first time, the received identifier from the Intrusion Prevention System snooper comprising a MAC address and the received identifier from the eNB radio comprising an IMSI number;
   determining a location for each wireless-enabled device detected at the first time, the determining the location further comprising mapping a received signal from the wireless-enabled device to an electronic interactive map of the physical space with a known marked location for each of the plurality of sensors;
   utilizing the plurality of sensors in the physical space to scan the physical space at a second time for wireless-enabled devices located within the predetermined distance from each of the plurality of sensors;
   receiving an identifier for each wireless-enabled device detected at the second time;
   determining a probability that a wireless-enabled device has moved in the time interval between the first time and the second time, based at least in part on the electronic interactive map of the physical space;
   determining a probability of a threat in the physical space based at least in part on the determined probability of movement; and
   transmitting the probability of the threat in the physical space to an administrative user computing device.

2. The method of claim 1, wherein the received MAC address identifier for a wireless-enabled device in the physical space is a spoofed MAC address.

3. The method of claim 1, wherein the wireless-enabled device is at least one of a smartwatch, smartphone, tablet, laptop computer, automobile, and smart appliance.

4. The method of claim 1, further comprising:
   mirroring the received identifier for a wireless-enabled device detected, by a honeypot for further threat analysis, the honeypot being in communication with at least one access point present in the physical space.

5. The method of claim 1, wherein the determining the probability of threat in the physical space is further based at least in part on:
   determining that a first subset of the wireless-enabled devices detected are known to an administrative user and a second subset of the wireless-enabled devices detected are unknown to the administrative user.

6. The method of claim 2, wherein the processor is further configured to determine a manufacturer of the wireless-enabled device based on the spoofed MAC address.

7. The method of claim 1, further comprising:
   comparing a number of wireless-enabled devices detected at the first time and corresponding identifiers with a number of wireless-enabled devices detected at the second time and corresponding identifiers, to determine which identifiers for wireless-enabled devices are spoofed.

8. A system comprising:
   a wireless communication network;
   a plurality of wireless-enabled devices located in a physical space, the wireless-enabled devices configured to communicate via the wireless communication network;
   a plurality of sensors in the physical space, each of the plurality of sensors configured as an Intrusion Prevention System snooper to intercept a wireless signal from at least one of the plurality of wireless-enabled devices in the physical space, receive RSSI signal strength information for at least one wireless-enabled device, and transmit information regarding the RSSI signal strength and an identifier for the at least one wireless-enabled device from which the signal was intercepted to a computing server;
   an interactive electronic map for the physical space with a known marked location for each of the plurality of sensors; and
   a processor configured to execute instructions to:
      receive information from the plurality of sensors regarding a the RSSI signal strength and identifier of each corresponding at least one wireless-enabled device located in the physical space, the information received by the processor at periodic time intervals;
      determine a location of the at least one wireless-enabled device associated with the received identifier, based at least in part on the RSSI signal strength and the interactive electronic map with the known marked location for each of the plurality of sensors;
      determine a probability of a threat in the physical space based at least in part on the determined location of the at least one wireless-enabled device; and
      transmit the probability of the threat in the physical space to an administrative user computing device.

9. The system of claim 8, wherein the wireless-enabled device is at least one of a smartwatch, smartphone, tablet, laptop computer, automobile, and smart appliance.

10. The system of claim 8, wherein the plurality of sensors in the physical space further comprise at least one eNB radio, the eNB radio configured to emulate a particular radio frequency, and the eNB radio comprising:

a multi-directional transceiver antenna maintained at a predetermined power level, the antenna connected to the eNB radio via a USB port.

11. The system of claim 8, wherein the processor is further configured to virtualize and host one or more access points from the physical space on a honeypot for further threat analysis.

12. The system of claim 8, wherein at least one of the plurality of sensors in the physical space is an eNB radio configured to emulate a base tower and mimic a 4G LTE frequency utilized by at least one cellular service provider, such that a wireless-enabled device in the physical space of the at least one cellular service provider is configured to connect with the eNB radio and the eNB radio is configured to determine an IMSI number for the connected wireless-enabled device.

13. The system of claim 8, wherein at least one of the plurality of sensors in the physical space is an eNB radio configured to rotate mimicking signals from a plurality of cellular service providers, such that a wireless-enabled device in the physical space of each of the plurality of cellular service providers is configured to connect with the eNB radio and the eNB radio is configured to determine an IMSI number for the wireless-enabled device, the rotation of the mimicked signals occurring at a predetermined time interval.

14. The system of claim 8, wherein the processor is further configured to execute instructions to generate a list of identifying information for detected wireless-enabled devices in the physical space, the identifying information for each detected wireless-enabled device comprising a MAC address and an IMSI number.

15. The system of claim 8, wherein the processor is further configured to determine the location of the wireless-enabled device based at least in part on a combination of information received from at least one IPS snooper sensor and at least one eNB radio sensor.

16. The system of claim 8, wherein at least one sensor of the plurality of sensors in the physical space is configured to sense at least one environmental condition in a physical space surrounding the at least one sensor.

17. The system of claim 16, wherein the probability of a threat in the physical space is based at least in part on the received information from at least one IPS snooper, identifier information of a corresponding at least one wireless-enabled device in the physical space, and also the sensed at least one environmental condition in the physical space surrounding the at least one sensor.

18. The system of claim 8, wherein at least one of the plurality of sensors is configured to intercept a plurality of wireless signals, the plurality of wireless signals comprising at least Wi-Fi and Bluetooth signals.

19. The system of claim 8, wherein at least one of the plurality of wireless-enabled devices is at least one of a firearm, taser, knife, concealed weapon, or other object designed to injure a person.

20. The system of claim 8, wherein the receiving the RSSI signal strength information further comprises: receiving an RSSI value from a wireless card of the at least one wireless-enabled device and converting the received RSSI value into a measurement.

* * * * *